C. SHABLEY.
Rotary Cultivator.

No. 51,757. Patented Dec. 26, 1865.

Witnesses:
Theo Tusch
Wm Treurn

Inventor:
Charles Shabley
per Munn & Co
Attys.

UNITED STATES PATENT OFFICE.

CHARLES SHABLEY, OF BROOKLYN, NEW YORK.

IMPROVEMENT IN PULVERIZING AND FURROWING DEVICES.

Specification forming part of Letters Patent No. 51,757, dated December 26, 1865.

*To all whom it may concern:*

Be it known that I, CHARLES SHABLEY, of Brooklyn, in the county of Kings and State of New York, have invented a new and Improved Pulverizer and Furrowing Device; and I do hereby declare that the following is a full, clear, and exact description thereof, which will enable others skilled in the art to make and use the same, reference being had to the accompanying drawings, forming part of this specification, in which—

Figure 1:
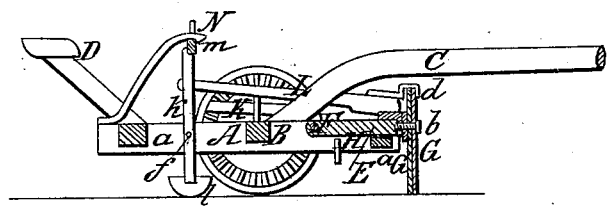
Figure 2:
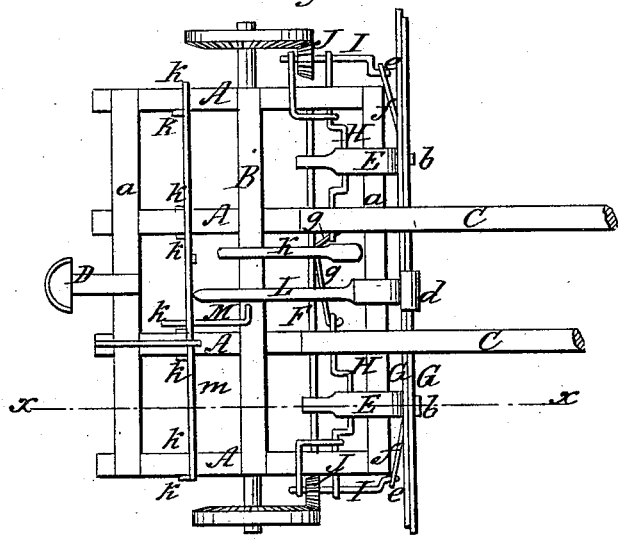
Figure 3:
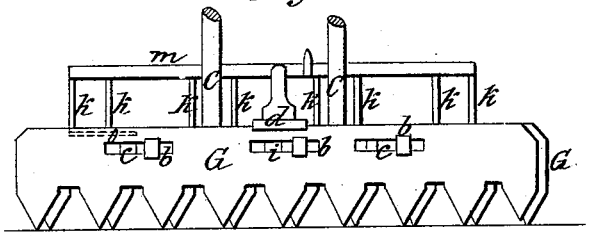

Figure 1 is a side sectional view of my invention, taken in the line $x\,x$, Fig. 2; Fig. 2, a plan or top view of the same; Fig. 3, a front view of the same.

Similar letters of reference indicate like parts.

This invention relates to a new and improved implement or device for pulverizing the ground and furrowing the same for the planting of corn and other seed in hills or drills.

The object of the invention is to obtain an implement or device which will leave the ground in good order or condition to receive the seed; and to this end it consists in the employment or use of a series of furrow-openers applied to a frame which is mounted on wheels, said frame having a pulverizing attachment at its front end composed of two reciprocating toothed plates arranged and operated in the manner hereinafter shown and described.

A represents four parallel bars, which are connected by cross-bars $a$ and an axle, B, the latter having a wheel at each end of it. These bars A are placed at a distance apart corresponding with the width desired between the furrows.

C C represent thills attached to the two central or inner bars, A A, and D is a driver's seat on the rear cross-bar $a$ of the machine.

E E are arms, the rear ends of which are fitted loosely on a rod or bar, F, which passes transversely through the bars A. In the front ends of these arms there are driven or otherwise secured bolts $b$, having heads upon them, said bolts passing through oblong horizontal slots $c$ in metal plates G G, which are toothed at their lower edges, as shown clearly in Fig. 1. These plates G G are placed directly one in front of the other, and they are allowed to slide or work freely to the right and left, the bolts $b$ serving as guides for the same, another guide, $d$, being also employed at the upper edges of the plates.

H H represent two rods or shafts, which are placed transversely in the front part of the machine, near its front end, and in line with each other. At the outer ends of the rods H there are bearings for shafts I, on the rear ends of which there are pinions J, which gear into teeth at the inner sides of the wheels on which the machine is mounted, and at the front ends of the shafts I there are cranks $e$, which are connected by rods $f$ with the toothed plates G G. By this means a reciprocating motion is given the plates G G as the machine or implement is drawn along, and the teeth of said plates pulverize the ground, rendering it light and friable for the furrow-openers, hereinafter described, and leaving the ground in a proper condition to receive the seed.

The pinions J may be thrown out of gear with the driving-wheels of the machine by moving the shafts H H, which is done by actuating a lever, K, the latter being connected by rods $g\,g$ with the inner ends of the shafts H H, as shown clearly in Fig. 2.

L is a lever, which is connected to the plates G G by a bolt, $h$, passing through oblong slots $i$ therein, this connection being the same as that of the arms E E. The guide $d$ is attached to the front end of this lever. By depressing the rear end of this lever L the teeth of the plates G G may be raised above the surface of the ground to admit of the machine being drawn from place to place. This lever may be kept down by a catch or fastening, M, arranged in any suitable way.

To both sides of the bars A there are secured by a rod or shaft, $j$, uprights, $k$, the latter extending down below A and having furrow-openers or shares $l$ secured between them, a furrow-opener or share being below or underneath each bar A. The upper ends of the uprights $k$ are connected by a cross-bar, $m$, with which a hook, N, engages to hold the uprights $k$ in a vertical position, so that the furrow-openers or shares may perform their work or make the necessary furrows. In turning the machine at the end of the field or in transporting or drawing it from place to place the driver draws back the bar *m*, which raises the furrow-openers or shares above the surface of the ground.

Having thus described my invention, I claim as new and desire to secure by Letters Patent—

1. The furrow-openers or shares *l*, attached to a frame mounted on wheels, in combination with reciprocating toothed plates G G, arranged and applied to the machine to operate in the manner substantially as and for the purpose herein set forth.

2. The attaching of the plates G G to the machine by means of arms E, (two or more,) fitted on a bar, F, and arranged, substantially as shown, to admit of the raising and lowering of said plates, as described.

3. The operating of the plates G G from the driving-wheels through the medium of crank-shafts and pinions I J and connecting-rods *f*, the shafts I having their bearings in sliding or adjustable rods or shafts H H, connected to a lever, K, by which the plates G G may be readily rendered operative or inoperative, as desired.

CHARLES SHABLEY.

Witnesses:
M. M. LIVINGSTON,
C. L. TOPLIFF.